(12) United States Patent
Frenkel et al.

(10) Patent No.: US 10,628,909 B2
(45) Date of Patent: Apr. 21, 2020

(54) GRAPHICS PROCESSING UNIT RESOURCE DEPENDENCY VIEWER

(71) Applicant: Apple Inc., Cupertino, CA (US)

(72) Inventors: Ohad Frenkel, Cupertino, CA (US); Eric O. Sunalp, Los Gatos, CA (US); Dustin J. Greene, San Jose, CA (US); Alp Yucebilgin, San Mateo, CA (US); Domenico Troiano, Santa Clara, CA (US); Maximilian Christ, Sunnyvale, CA (US); Andrew M. Sowerby, San Francisco, CA (US); Lionel Lemarie, San Mateo, CA (US); Sebastian Schaefer, Beckenham (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/996,300

(22) Filed: Jun. 1, 2018

(65) Prior Publication Data
US 2019/0370927 A1    Dec. 5, 2019

(51) Int. Cl.
*G06F 13/14* (2006.01)
*G06T 1/20* (2006.01)
(Continued)

(52) U.S. Cl.
CPC ............... *G06T 1/20* (2013.01); *G06F 8/433* (2013.01); *G06F 9/505* (2013.01); *G06F 11/3612* (2013.01); *G06T 11/206* (2013.01)

(58) Field of Classification Search
CPC ............................... G06T 1/20; G06T 11/206
See application file for complete search history.

(56) References Cited

U.S. PATENT DOCUMENTS

| 8,572,573 B2 | 10/2013 | Baliga |
| 9,384,522 B2 | 7/2016 | Frascati |

(Continued)

OTHER PUBLICATIONS

Lazarescu, Mihai T. and Luciano Lavagno, "Dynamic trace-based data dependency analysis for parallelization of C programs," Source Code Analysis and Manipulation (SCAM), 2012 IEEE 12th International Working Conference on, Sep. 23-24, 2012.

*Primary Examiner* — Charles Tseng
(74) *Attorney, Agent, or Firm* — Blank Rome LLP

(57) ABSTRACT

A Resource Dependency Viewer for graphics processing unit (GPU) execution information is disclosed. The Resource Dependency Viewer provides profiling/debugging information concurrently with information about execution flow, resource utilization, execution statistics, and orphaned resources, among other things. A user-interactive graph ("dependency graph") may be provided via a graphical user interface to allow interactive analysis of code executed on a GPU (e.g., graphics or compute code). Resource utilization and execution flow of encoders may be identified by analyzing contents of a GPU workload representative of a GPU execution trace to generate the dependency graph. Information about dependencies and execution statistics may be further analyzed using heuristics to identify potential problem areas. The dependency graph may include visual indicators of these problem areas. Results oriented navigation from the dependency graph and other visual panes provide debugging navigation techniques different than a debugging interface configured to "step" through code or provide static analysis.

18 Claims, 12 Drawing Sheets

(51) Int. Cl.
*G06T 11/20* (2006.01)
*G06F 11/36* (2006.01)
*G06F 8/41* (2018.01)
*G06F 9/50* (2006.01)

(56) References Cited

U.S. PATENT DOCUMENTS

| | | | |
|---|---|---|---|
| 2003/0086494 A1* | 5/2003 | Wang | G10L 19/005 375/240.12 |
| 2006/0143596 A1* | 6/2006 | Miyashita | G06F 8/433 717/131 |
| 2009/0002379 A1* | 1/2009 | Baeza | G06T 1/20 345/522 |
| 2010/0214305 A1* | 8/2010 | Zimmer | G06T 1/20 345/545 |
| 2011/0157001 A1 | 6/2011 | Bose | |
| 2014/0035922 A1* | 2/2014 | Watt | G06F 11/323 345/440 |
| 2016/0179714 A1* | 6/2016 | Acharya | G06F 12/023 711/158 |
| 2016/0358307 A1 | 12/2016 | Brothers | |

* cited by examiner

| APPLICATION A 970 | PHOTOS 971 | QUICKEN 972 | IMOVIE 973 | APPLICATION B 974 | 975 |
|---|---|---|---|---|---|
| OTHER APPLICATION SERVICES 360 | SPRITE KIT 961 | SCENE KIT 962 | CORE ANIMATION 963 | CORE GRAPHICS 964 | 980 |
| O/S SERVICES 950 | OPENGL OR OPENCL 951 | METAL 952 | USER MODE DRIVERS 953 | SOFTWARE RASTERIZER 954 | 985 |
| O/S KERNEL 945 | | | | | 990 |
| HARDWARE 940 | | | | | 995 |

FIG. 9

GRAPHICS PROCESSING UNIT RESOURCE DEPENDENCY VIEWER

BACKGROUND

This disclosure relates generally to the field of graphics processing on a graphics processing unit (GPU) and GPU workloads executed on a GPU (e.g., compute processing). More particularly, but not by way of limitation, this disclosure relates to an interactive visual debugger/profiler for a graphics processing unit (GPU), having multiple interactive panes to display information captured from a GPU workload and optionally a GPU execution trace buffer (e.g., to provide additional information for a "frame capture" tool capturing a GPU workload). The interactive visual debugger/profiler, referred to as a Resource Dependency Viewer (or simply "Dependency Viewer"), represents an improvement to the art of GPU processing code testing and development by providing information to an application developer to assist in GPU processing code implementation and refinement (e.g., optimization process at the functional level).

Computers, mobile devices, and other computing systems typically have at least one programmable processor, such as a central processing unit (CPU) and other programmable processors specialized for performing certain processes or functions (e.g., graphics processing). Examples of a programmable processor specialized to perform graphics processing operations include, but are not limited to, a GPU, a digital signal processor (DSP), a field programmable gate array (FPGA), and/or a CPU emulating a GPU. GPUs, in particular, comprise multiple execution cores (also referred to as shader cores) designed to execute the same instruction on parallel data streams, making them more effective than general-purpose processors for operations that process large blocks of data in parallel. For instance, a CPU functions as a host and hands-off specialized parallel tasks to the GPUs. Specifically, a CPU can execute an application stored in system memory that includes graphics data associated with a video frame. Rather than processing the graphics data, the CPU forwards the graphics data to the GPU for processing; thereby, freeing the CPU to perform other tasks concurrently with the GPU's processing of the graphics data.

GPU processing, such as render-to-texture passes may be implemented by a series of encoders. Encoders may utilize outputs from previous encoders and other graphical parameters (e.g., textures) as "resources" to perform their execution. Accordingly, GPU processing includes a series of functions that execute in an execution flow (sometimes referred to as a "graphics pipeline") to produce a result to be displayed. Encoders often write and read data from one or more memory caches to improve performance and power saving. For instance, a render-to-texture pass encoder renders a frame to a texture resource that can be later re-passed to a shader encoder for further processing. By doing so, the GPU could be writing to and/or reading from the texture resource before the GPU is done utilizing the texture resource. The highly parallel nature of GPU processing may make it difficult for an application developer (working at the source code level) to understand exactly how the GPU is processing their source code. For example, the application developer may not know the exact order of processing performed by a GPU for a given source code input and may not know exactly how encoders and resources have been "chained" together to produce a graphical result. Thus, even though an application may be presenting accurate results, it may not be performing processing that is fully optimized. Having visibility into how a GPU actually processes encoders and utilizes resources associated with those encoders could allow an application developer to improve the source code and thereby improve GPU performance of a particular application (e.g., by altering the source code of that application). Accordingly, disclosed implementations of the dependency viewer represent an improvement to the art of graphical code implementation because the application developer may be provided information to address possible "unseen" performance issues.

SUMMARY

In one implementation, a non-transitory program storage device is disclosed. The program storage device is readable by a processor and comprising instructions stored thereon to cause the processor to: capture a plurality of frames or compute workloads created by a graphics processor hardware resource; create a data structure for a plurality of encoders and resources identified in the GPU workload after processing by a graphics processor, the data structure representative of a dependency graph where nodes represent encoders or resources and edges represent relationships between nodes; analyze execution information available from the GPU workload to determine information associated with at least one encoder node to obtain execution statistics pertaining to an execution of the at least one encoder on the graphics processor; augment the data structure with the obtained execution statistics; and present a graphical display representation of the dependency graph and at least one of the obtained execution statistics associated with a node responsible for at least a portion of the execution statistic on a graphical user interface display.

In another implementation, GPU trace buffer information may be used to further create and maintain the dependency graph.

In one embodiment, each of the above described (and subsequently disclosed) methods, and variation thereof, may be implemented as a series of computer executable instructions. Such instructions may use any one or more convenient programming language. Such instructions may be collected into engines and/or programs and stored in any media that is readable and executable by a computer system or other programmable control device.

BRIEF DESCRIPTION OF THE DRAWINGS

While certain embodiments will be described in connection with the illustrative embodiments shown herein, this disclosure is not limited to those embodiments. On the contrary, all alternatives, modifications, and equivalents are included within the spirit and scope of this disclosure as defined by the claims. In the drawings, which are not to scale, the same reference numerals are used throughout the description and in the drawing figures for components and elements having the same structure, and primed reference numerals are used for components and elements having a similar function and construction to those components and elements having the same unprimed reference numerals.

FIG. 9 is a block diagram of an implementation of a software layer and architecture where embodiments of the present disclosure may operate.

DETAILED DESCRIPTION

Figure 1:
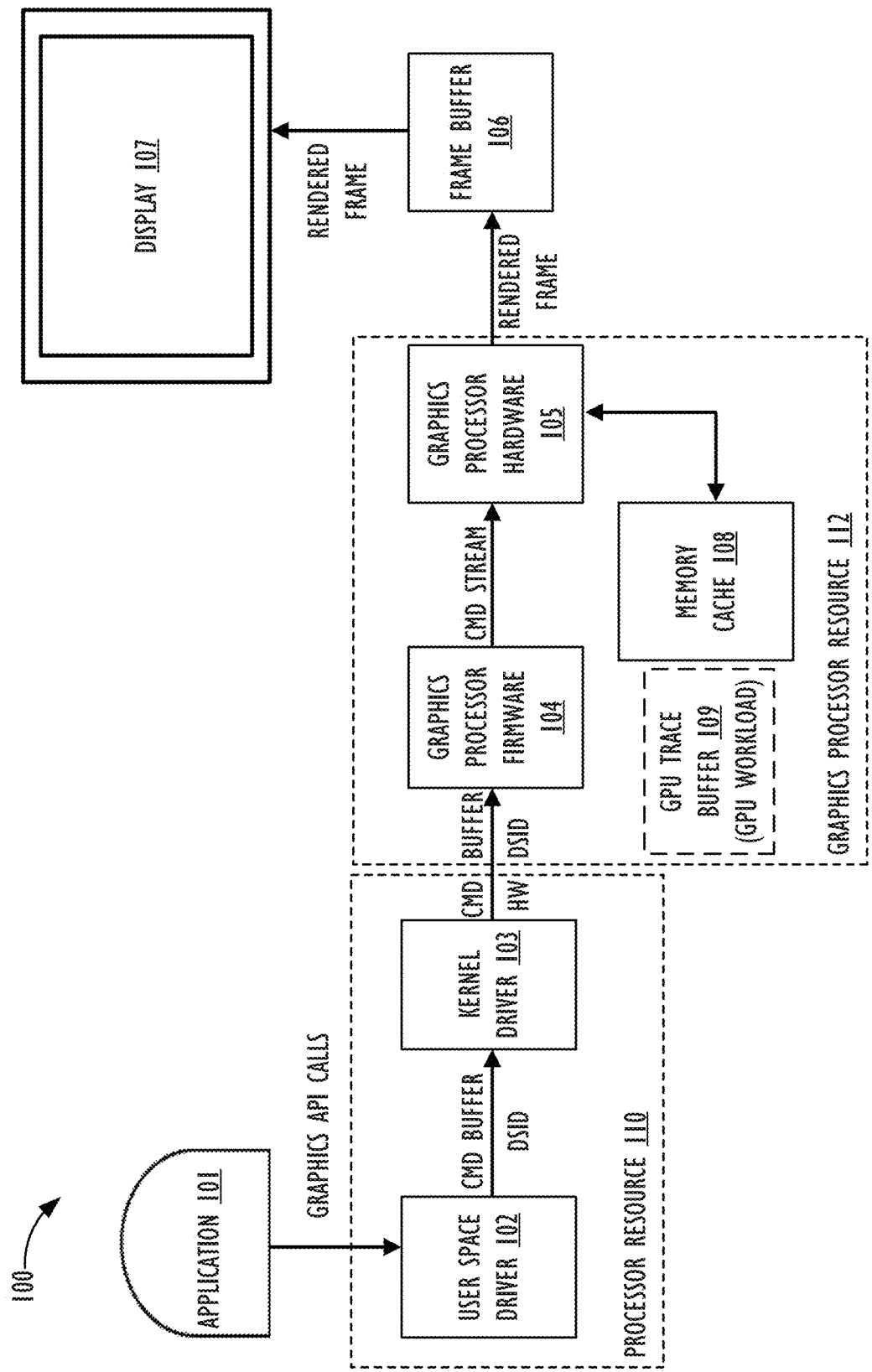
FIG. 1 is a diagram of a graphics processing path where embodiments of the present disclosure may operate.

This disclosure includes various example embodiments that provide an interactive Resource Dependency Viewer ("Dependency Viewer") to present information captured from an output frame (as generated by a GPU) to provide detailed run-time execution information to an application developer, for example, for profiling or debugging graphics code. The disclosed Dependency Viewer may provide an interactive navigation through a dependency graph representative of execution flow or through a list view style presentation of encoder execution flow. Whenever navigation commands are received in any section of the Dependency Viewer, all presented "panes" of the graphical user interface may be updated to be consistent with each other as part of the response to the navigation instruction. In one implementation, graphics code may be from a graphics API (e.g., OpenGL®, Direct3D®, or Metal® ((OPENGL is a registered trademark of Silicon Graphics, Inc.; DIRECT3D is a registered trademark of Microsoft Corporation; and METAL is a registered trademark of Apple Inc.)) that allows a developer and/or application to create one or more resources (e.g., buffers and textures). The graphics API may also interact with a central processing unit (CPU) to generate one or more set commands within a command buffer to be provided to a GPU to render a frame (e.g., update a display device). After the CPU presents and commits the command buffer to the GPU for execution, the graphics driver schedules the commands for the GPU to execute. GPU trace information may be optionally collected while the GPU executes. For example, GPU trace information may be captured at the software level or at the firmware/hardware level and be turned on and off based on a setting by an application developer. For example, the debug trace information collection process may represent an additional overhead that is not always desirable for code that is not under development.

In the following description, for purposes of explanation, numerous specific details are set forth in order to provide a thorough understanding of the inventive concept. As part of this description, some of this disclosure's drawings represent structures and devices in block diagram form in order to avoid obscuring the disclosed principles. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosure, and multiple references to "one embodiment" or "an embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "kernel" in this disclosure refers to a computer program that is part of a core layer of an operating system (e.g., Mac OSX™) typically associated with relatively higher or the highest security level. The "kernel" is able to perform certain tasks, such as managing hardware interaction (e.g., the use of hardware drivers) and handling interrupts for the operating system. To prevent application programs or other processes within a user space from interfering with the "kernel," the code for the "kernel" is typically loaded into a separate and protected area of memory. Within this context, the term "kernel" may be interchangeable throughout this disclosure with the term "operating system kernel."

The disclosure also uses the term "compute kernel," which has a different meaning and should not be confused with the term "kernel" or "operating system kernel." In particular, the term "compute kernel" refers to a program for a graphics processor (e.g., GPU, DSP, or FPGA). In the context of graphics processing operations, programs for a graphics processor are classified as a "compute kernel" or a "shader." The term "compute kernel" refers to a program for a graphics processor that performs general compute operations (e.g., compute commands), and the term "shader" refers to a program for a graphics processor that performs graphics operations (e.g., render commands).

As used herein, the term "command" in this disclosure refers to a graphics API command encoded within a data structure, such as command buffer or command list. The term "command encoder" (or simply "encoder") can refer to a render (or other) command (e.g., for draw calls) and/or a compute command (e.g., for dispatch calls) that a graphics processor is able to execute. All types of encoders are pertinent to this disclosure and may be simply thought of as encoders that perform different functions. From the perspective of the disclosed Dependency Viewer, encoders consume inputs (e.g., resources) and produce outputs through their execution that may represent inputs to other encoders. In some implementations, the disclosed Dependency Viewer will identify different encoder commands and create relationships between any executed encoder commands for which information is present in the GPU workload or GPU trace information. Each command encoder may be associated with specific graphics API resources (e.g., buffers and textures) and states (e.g., stencil state and pipeline state) for encoding the commands within each section of a given command buffer.

For the purposes of this disclosure, the term "processor" refers to a programmable hardware device that is able to process data from one or more data sources, such as memory. One type of "processor" is a general-purpose processor (e.g., a CPU) that is not customized to perform specific operations (e.g., processes, calculations, functions, or tasks), and instead is built to perform general compute operations. Other types of "processors" are specialized processor customized to perform specific operations (e.g., processes, calculations, functions, or tasks). Non-limiting examples of specialized processors include GPUs, floating-point processing units (FPUs), DSPs, FPGAs, application-specific integrated circuits (ASICs), and embedded processors (e.g., universal serial bus (USB) controllers).

As used herein, the term "graphics processor" refers to a specialized processor for performing graphics processing operations. Examples of "graphics processors" include, but are not limited to, a GPU, DSPs, FPGAs, and/or a CPU emulating a GPU. Also, the term "graphics processing unit" or the acronym GPU is used to specifically refer to that type of graphics processor. In one or more implementations, graphics processors are also able to perform non-specialized operations that a general-purpose processor is able to perform. As previously presented, examples of these general compute operations are compute commands associated with compute kernels.

As used herein, the term "resource" refers to an allocation of memory space for storing data that is accessible to a graphics processor, such as a GPU, based on a graphics API. For the purpose of this disclosure, the term "resource" is synonymous and can also be referenced as "graphics API resource." Examples of graphics API resources include buffers and textures. Buffers represent an allocation of unformatted memory that can contain data, such as vertex, shader, and compute state data. Textures represents an allocation of memory for storing formatted image data.

FIG. 1 is a diagram of a graphics processing path 100 where implementations of the present disclosure may operate. FIG. 1 illustrates an example in which the graphics processing path 100 utilizes a processor resource 110 and a graphics processor resource 112. The processor resource 110 includes one or more general-purpose processors (e.g., CPUs), where each processor has one or more cores. The processor resource 110 can also contain and/or communicate with memory, microcontrollers, and/or any other hardware resources a processor may utilize to process commands for graphics processor resource 112 to execute. The graphics processor resource 112 includes one or more graphics processors (e.g., GPUs), where each graphics processor has one or more execution cores and other computing logic for performing graphics and/or general compute operations. Stated another way, the graphics processor resource 112 may also encompass and/or communicate with memory (e.g., memory cache 108), and/or other hardware resources to execute programs, such as shaders or compute kernels. For example, graphics processor resource 112 is able to process shaders with a rendering pipeline and compute kernels with a compute pipeline.

FIG. 1 illustrates that application 101 generates graphics API calls for the purpose of encoding commands for the graphics processor resource 112 to execute. To generate the graphics API calls, application 101 includes code written with a graphics API. The graphics API (e.g., Metal®) represents a published and/or standardized graphics library and framework that define functions and/or other operations that application 101 is able to have with a graphics processor. For example, the graphics API allows application 101 to be able to control the organization, processing, and submission of render and compute commands, as well as the management of associated data and resources for those commands.

In one or more implementations, application 101 is a graphics application (or GPU compute application) that invokes the graphics API to convey a description of a graphics scene (or perform a compute task). Specifically, the user space driver 102 receives graphics API calls from application 101 and maps the graphics API calls to operations understood and executable by the graphics processor resource 112. For example, the user space driver 102 can translate the API calls into commands encoded within command buffers before being transferred to kernel driver 103. The translation operation may involve the user space driver 102 compiling shaders and/or compute kernels into commands executable by the graphics processor resource 112. The command buffers are then sent to the kernel driver 103 to prepare the command buffers for execution on the graphics processor resource 112. As an example, the kernel driver 103 may perform memory allocation and scheduling of the command buffers to be sent to the graphics processor resource 112. For the purpose of this disclosure and to facilitate ease of description and explanation, unless otherwise specified, the user space driver 102 and the kernel driver 103 are collectively referred to as a graphics driver.

FIG. 1 illustrates that the graphics processor firmware 104 obtains command buffers that processor resource 110 commits for execution. The graphics processor firmware 104 can perform a variety of operations to manage the graphics processor hardware 105 that includes powering up the graphics processor hardware 105 and/or scheduling the order of commands that the graphics processor hardware 105 receives for execution. With reference to FIG. 1 as an example, the graphics processor firmware 104 can be implemented by a microcontroller that executes the graphics processor firmware 104. Specifically, the microcontroller could be embedded in the same package as a graphics processor within the graphic processor resource 112 and setup to pre-process commands for the graphics processor. In other implementations, the microcontroller is physically separated from the graphics processor.

After scheduling the commands, in FIG. 1, the graphics processor firmware 104 sends command streams to the graphics processor hardware 105. The graphics processor hardware 105 then executes the commands within the command streams according to the order the graphics processor hardware 105 receives the commands. During execution information may be optionally stored in GPU trace buffer 109. The execution information may include order of operations, statistics, utilization information, or other parameters of the GPU (and optionally CPU) during execution. Also, a CPU may be configured to emulate a GPU.

Typically, graphics processor hardware 105 includes multiple (e.g., numerous) execution cores, and thus, can execute a number of received commands in parallel. The graphics processor hardware 105 then outputs rendered frames to frame buffer 106. In one implementation, the frame buffer 106 is a portion of memory, such as a memory buffer, that contains a bitmap that drives display 107. Display 107 subsequently accesses the frame buffer 106 and converts (e.g., using a display controller) the rendered frame (e.g., bitmap) to a video signal for display.

Although FIG. 1 illustrates a specific implementation of graphics processing path 100, the disclosure is not limited to the specific implementation illustrated in FIG. 1. For instance, graphics processing path 100 may include other frameworks, APIs, and/or application layer services not specifically shown in FIG. 1. As an example, application 101 may have access to Core Animation to animate views and/or user interfaces for application 101. FIG. 1 also does not illustrate all of the hardware resources and/or components that graphics processing path 100 may utilize (e.g., power management units or memory resources, such as system memory). Additionally or alternatively, even though FIG. 1 illustrates that processor resource 110 and graphics processor resource 112 are separate devices, other implementations could have the processor resource 110 and graphics processor resource 112 integrated on a single device (e.g., a system-on-chip). The use and discussion of FIG. 1 is only an example to facilitate ease of description and explanation.

Figure 2:
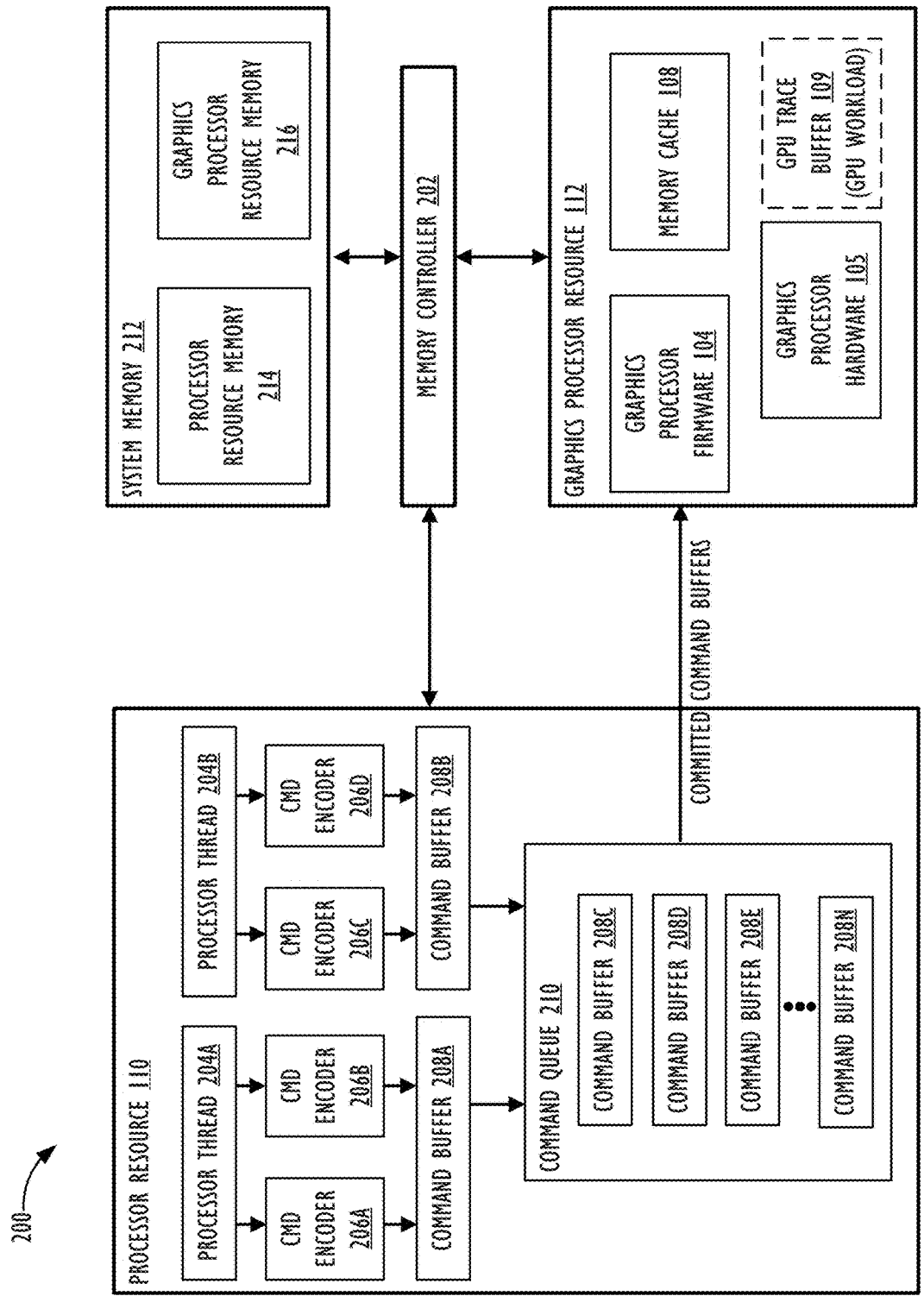
FIG. 2 is a block diagram of a system where embodiments of the present disclosure may operate.

FIG. 2 is a block diagram of a system 200 where implementations of the present disclosure may operate. Specifically, system 200 is able to implement the graphics processing path 100 shown in FIG. 1. FIG. 2 illustrates that system 200 includes a processor resource 110 and a graphics processor resource 112. FIG. 2 illustrates processor threads 204A and 204B. Processor thread 204A is tasked with utilizing command encoders 206A and 206B and processor thread 204B is tasked with utilizing command encoder 206C and 206D. The command encoders 206A and 206B encode commands within command buffer 208A and command encoders 206C and 206D encode commands within command buffer 208B. A different number of processor threads and command encoders can be included in other implementations compared to two processor threads and four command encoders shown in the example of FIG. 2. The command encoders 206A-206D represents encoders that encodes commands into command buffers 208A and 208B for the graphics processor resource 112 to execute. Examples of command encoder types include, but are not limited to, Blit command encoders (e.g., graphics API resource copy and graphics API resource synchronization commands), compute command encoders (e.g., compute commands), and render command encoders (e.g., render commands).

Command buffers 208A and 208B, which are also referred to as "command lists," represent data structures that store a sequence of encoded commands for graphics processor resource 112 to execute. When one or more graphics API calls present and commit command buffers 208A and 208B to a graphics driver (e.g., the user space driver 102 shown FIG. 1), the processor resource 110 organizes the command buffers 208A and 208B into a command queue 210. The command queue 210 organizes the order in which command buffers 208 are sent to graphics processor resource 112 for execution. Using FIG. 2 as an example, command queue 210 contains command buffers 208C-208N, where command buffer 208C is at the top of the command queue 210 and is the next command buffer 208C to be sent to graphics processor resource 112 for execution. When processor resource 110 commits command buffers 208A and 208B for execution, the processor resource 110 is unable to encode any additional commands into command buffers 208A and 208B. After committing a command buffer 208, the command buffer is sent to the graphics processor resource 112 for execution.

The example of FIG. 2 also illustrates that processor resource 110 and graphics processor resource 112 bilaterally communicate with a memory controller 202. The memory controller 202 manages the flow of information to and from system memory 202 and is sometimes tasked with maintaining system memory 212 itself (e.g., refresh or other functionality depending upon the type of memory). As shown in FIG. 2, a single memory controller 202 performs memory control for both the processor resource 110 and graphics processor resource 112. In another implementation, the memory controller 202 includes separate memory controllers, one memory control for processor resource 110 and another memory controller for graphics processor resource 112. The memory controller 202 bilaterally communicates with system memory 212, which may be divided into processor resource memory 214 and graphics processor resource memory 216. Some implementations of system memory 212 use physically or logically independent memory for each of the processor resource 110 and graphics processor resource 112, while other embodiments call for sharing system memory 212 on a physical or logical basis.

Although FIG. 2 illustrates a specific implementation of a system 200 to execute graphics operations with an optional population of GPU trace buffer 109, the disclosure is not limited to the specific implementation illustrated in FIG. 2. For instance, even though FIG. 2 illustrates a single command queue 210; persons of ordinary skill in the art are aware that command buffers 208 can be placed into other command queues 210 not shown in FIG. 2. The use and discussion of FIG. 2 is only an example to facilitate ease of description and explanation.

Figure 3:
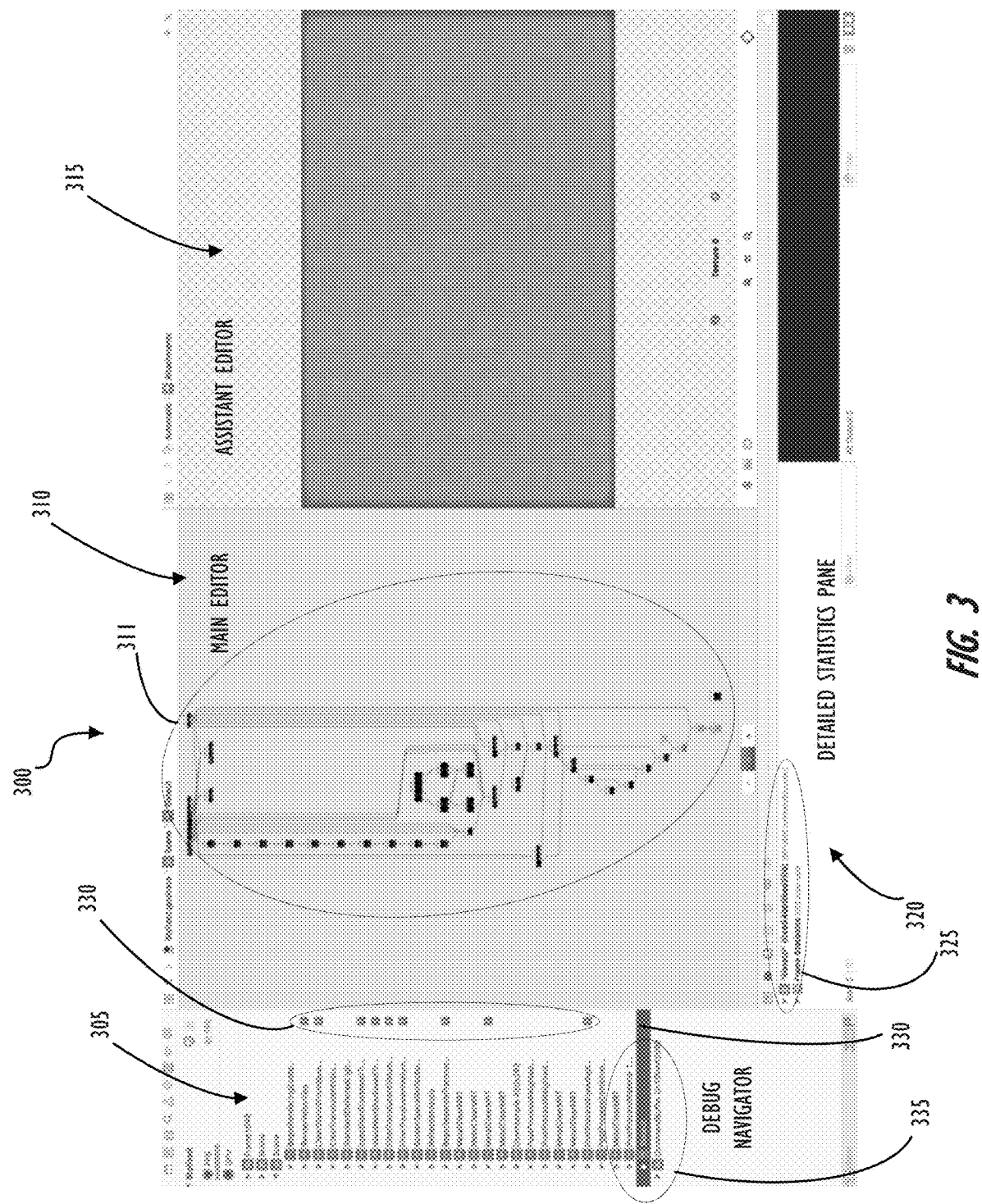
FIG. 3 is a first example screen capture illustrating a Resource Dependency Graph, Debug Navigator, Main Editor, Assistant Editor, and Detailed Statistics Pane according to one or more disclosed embodiments.

FIG. 3 is a first example screen capture 300 illustrating a Resource Dependency Graph 311, Debug Navigator 305, Main Editor 310, Assistant Editor 315, and Detailed Statistics Pane 320 according to one or more disclosed embodiments. On the left-hand portion of screen capture 300 a list-view representation of debug navigator 335 is shown. Debug navigator 305, in this example, lists encoders from top to bottom in an execution order as derived, for example, from a captured GPU workload or GPU trace information. Area 335 in debug navigator 305 illustrates a "currently selected" encoder. As discussed further below, selection of an encoder in the debug navigator 305 causes all views of the disclosed Dependency Viewer to be updated relative to that point in execution flow. That is, for some implementations, dependency graph 311 in Main Editor 310 will automatically adjust to position that encoder's node in the graph within the displayed viewing area. Debug Editor 305 further includes optional annotations (e.g., icons) next to some of the encoders as illustrated in area 330. These icons style annotations may provide a visual cue to a user that detailed heuristic and machine learning analysis (discussed below) may have identified a potential area for further investigation (e.g., the associated encoder) by an application developer. Also, detailed statistics pane which illustrates execution statistics for a selected encoder as a list view in area 325, may be refreshed based on the navigation selection.

In this example, Main Editor 310 includes a graphical representation (e.g., on a GUI) of dependency graph 311. As explained throughout this disclosure, for some implementations, nodes of a dependency graph 311 represent encoders and edges between nodes of the dependency graph 311 represent associations with connected encoders. For example, in one implementation edges go from resources (outputs of an encoder) to encoders. This information may be used to derive either a direct or implied relationship between the two encoders. Thus, as explained further below, this relationship may form the dependency graph and then additional, more "fine-grained" information, may be added to the dependency graph. Also, although not visible in screen capture 300, each node may have annotations next to it to provide statistics for the execution of that encoder (See FIG. 6). Assistant Editor 315 illustrates a graphical effect and/or resource associated with a navigation selection. In this example Assistant Editor 315 is illustrating a texture graphical effect/resource.

The associations and relative locations of nodes in dependency graph 311 may provide information helpful to an application developer when testing/debugging a graphical application. That is, the actual "structure" of the graph may, in some cases, provide valuable information to an application developer. For example, if there is a node in the graph that does not have an outgoing edge, that node may be representative of unnecessary work because the work product (e.g., output) is never again used (e.g., orphaned within the graph). In general, this type of node may represent a more optimal implementation when there are fewer leaf nodes. Also, code complexity may be apparent if a node is connected to an area of the graph that has high complexity. In one example implementation, the dependency graph 311 generation process takes as input a function stream and Metal shader reflection data that is captured by the GPU capture tool (e.g., frame capture). The function stream may include every Metal API function call (and the data that is encapsulated in each function call) that is called by the user application executing on a GPU being analyzed (e.g., either a graphics application or GPU compute workload). For example, Metal shader reflection data is part of the 'encapsulated' data that comes with the function stream (amongst other things). This data is then used to create a state mirror as an iteration is performed over the function stream. At any point in the function stream (e.g., point of execution flow), the state mirror represents the state of all objects at that time (e.g., execution time such as a current instruction pointer). As the iteration over the function stream is performed, updates are applied to the state mirror and from that state the dependency graph may be built. From a dependency graph building perspective, analysis is initially focused on encoders and their inputs and outputs. Continuing with this example implementation, encoders are marked off by the begin/end functions of an encoder, as defined Metal API. In between these markers, representing the execution time while an encoder is active, inputs and outputs created by that encoder may be stored in an access table. That access table may then be used to derive and associate applicable edges between encoders that have dependencies on any identified resources (dependencies indicate associations). For example, in one implementation, once every encoder has been processed, a global access table may be built from the access tables for all encoders. The global access table may then be used to build edges between encoders based on resource dependencies. During the edge building process, Metal specific features may be taken into account, such as resource views.

Figure 4A:
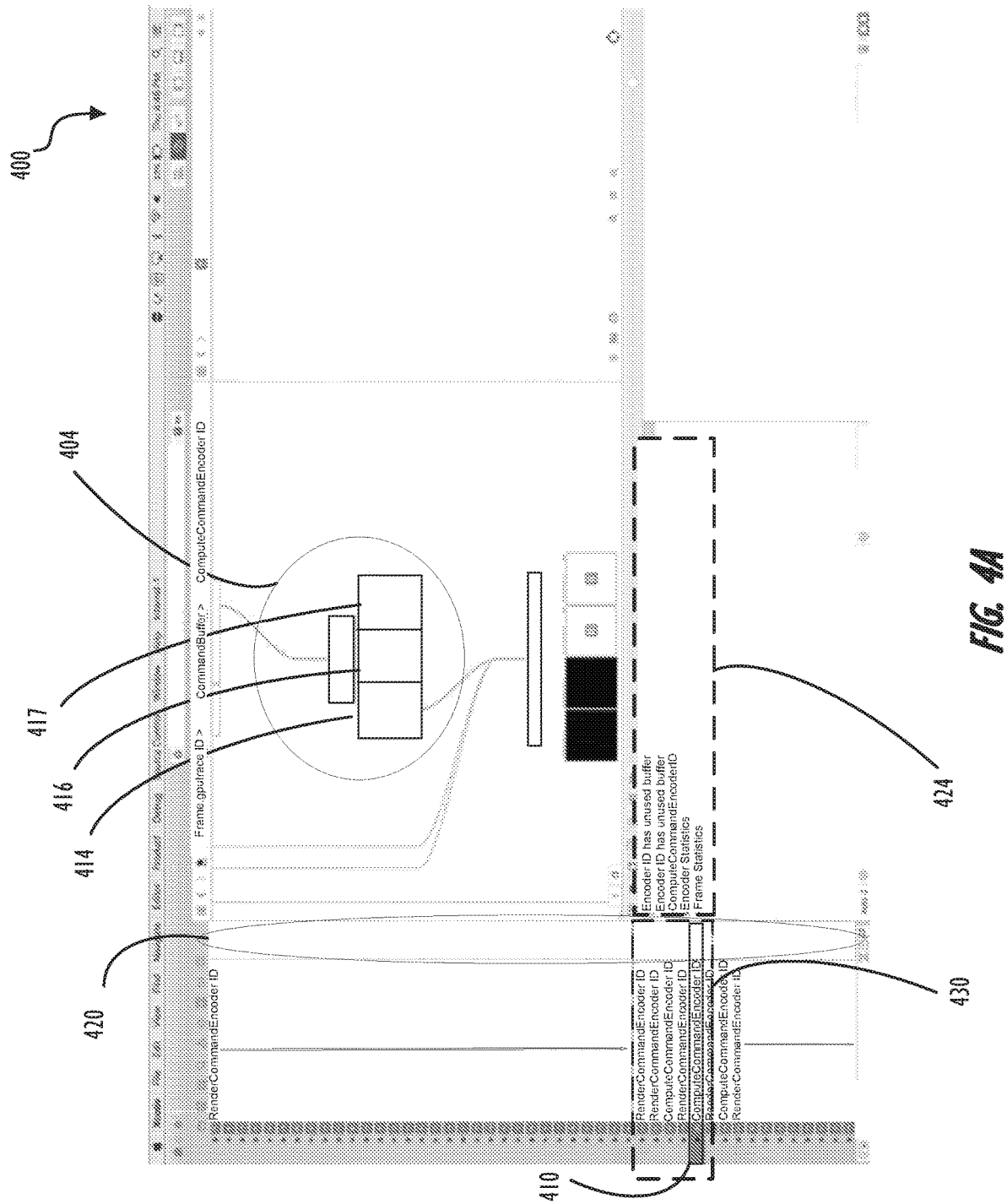
FIG. 4A is a second example screen capture illustrating a Resource Dependency Graph, Debug Navigator, Main Editor, Assistant Editor, and Detailed Statistics Pane according to one or more disclosed embodiments.
Figure 4B:
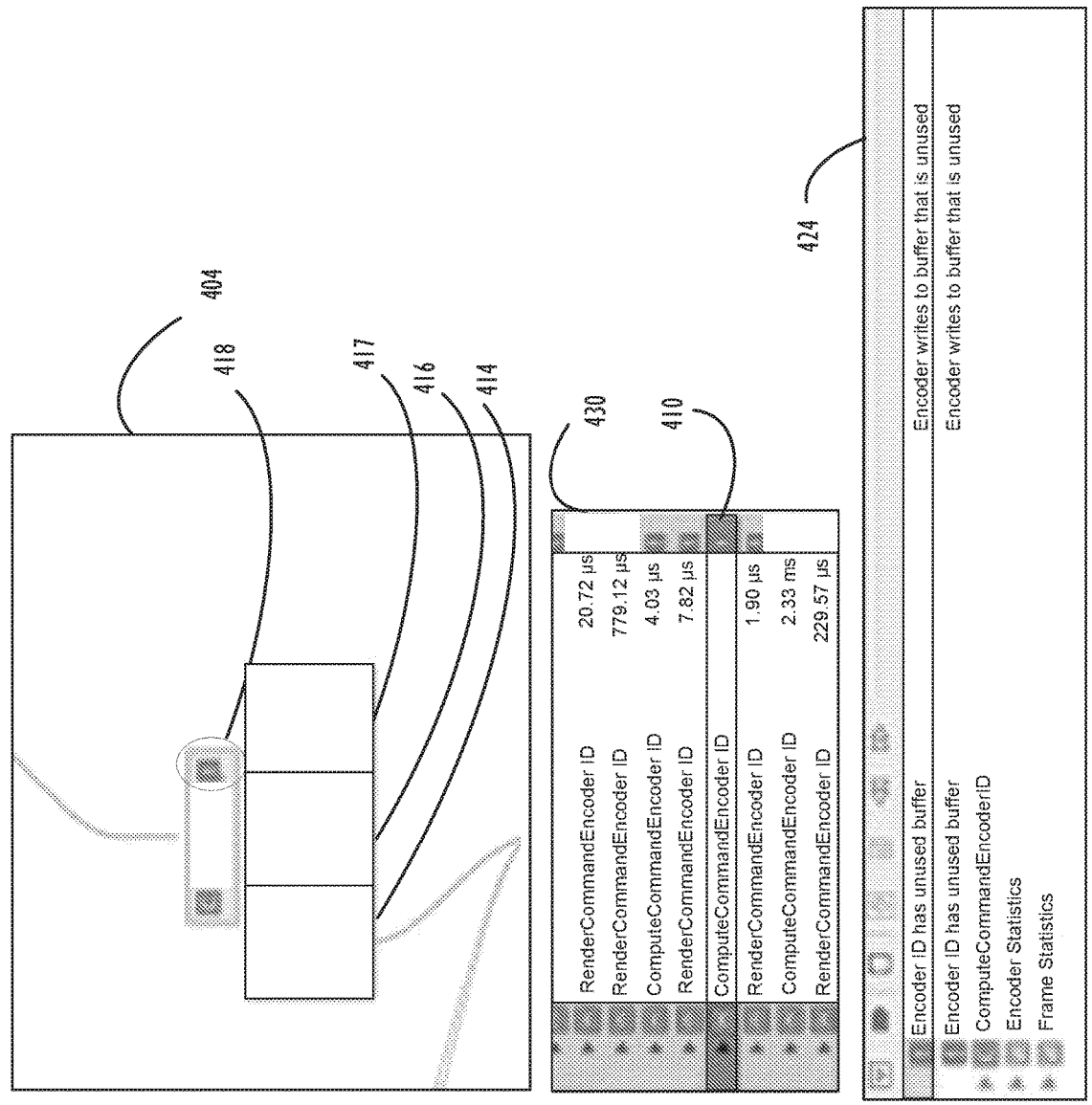
FIG. 4B shows selected elements from FIG. 4A at a larger view to illustrate additional detail.

Referring now to FIGS. 4A-B, screen capture 400 in FIG. 4A is a second example screen capture illustrating another view of a portion of a Resource Dependency Graph 404, Debug Navigator, Main Editor, Assistant Editor, and Detailed Statistics Pane according to one or more disclosed embodiments. In screen capture 400 area 404 highlights a node of the graph where there are three different resources 414, 416, and 417. As can be seen in area 404, only resource 414 has an outgoing edge. This may be an indication that components 416 and 417 are not needed because they are not used further along in the execution pipeline. Area 420 again illustrates possible annotations and visual cues that may be associated with encoder commands in the debug navigator. The currently selected encoder is identified at 410 and information presented in all other panes of the Resource Dependency Viewer contain information relative to that selection.

FIG. 4B represents selected elements from screen capture 400 at a larger view to illustrate additional detail. FIG. 4B illustrates annotation area 420 and the currently selected encoder is identified by 410' (only a portion is shown in this figure). Area 421 illustrates "exclamation point" icons that may be additionally color coded to bring attention to a user viewing the display. Block 410 also includes an icon as illustrated in area 418. Area 430 represents an enlargement of a portion of the debug navigator pane and illustrates annotations (e.g., statistics) and visual cues (e.g., icons) associated with encoders presented in the list view. Finally, area 424 represents an enlarged area of the statistics pane from screen capture 400. In this example, the statistics are associated with the currently selected encoder 410 and may be presented as a list view where further "drill-down" into statistic groups may be allowed. For example, statistics may be grouped into Frame statistics or Encoder statistics, and may provide detailed information about actual execution metrics.

Figure 5A:
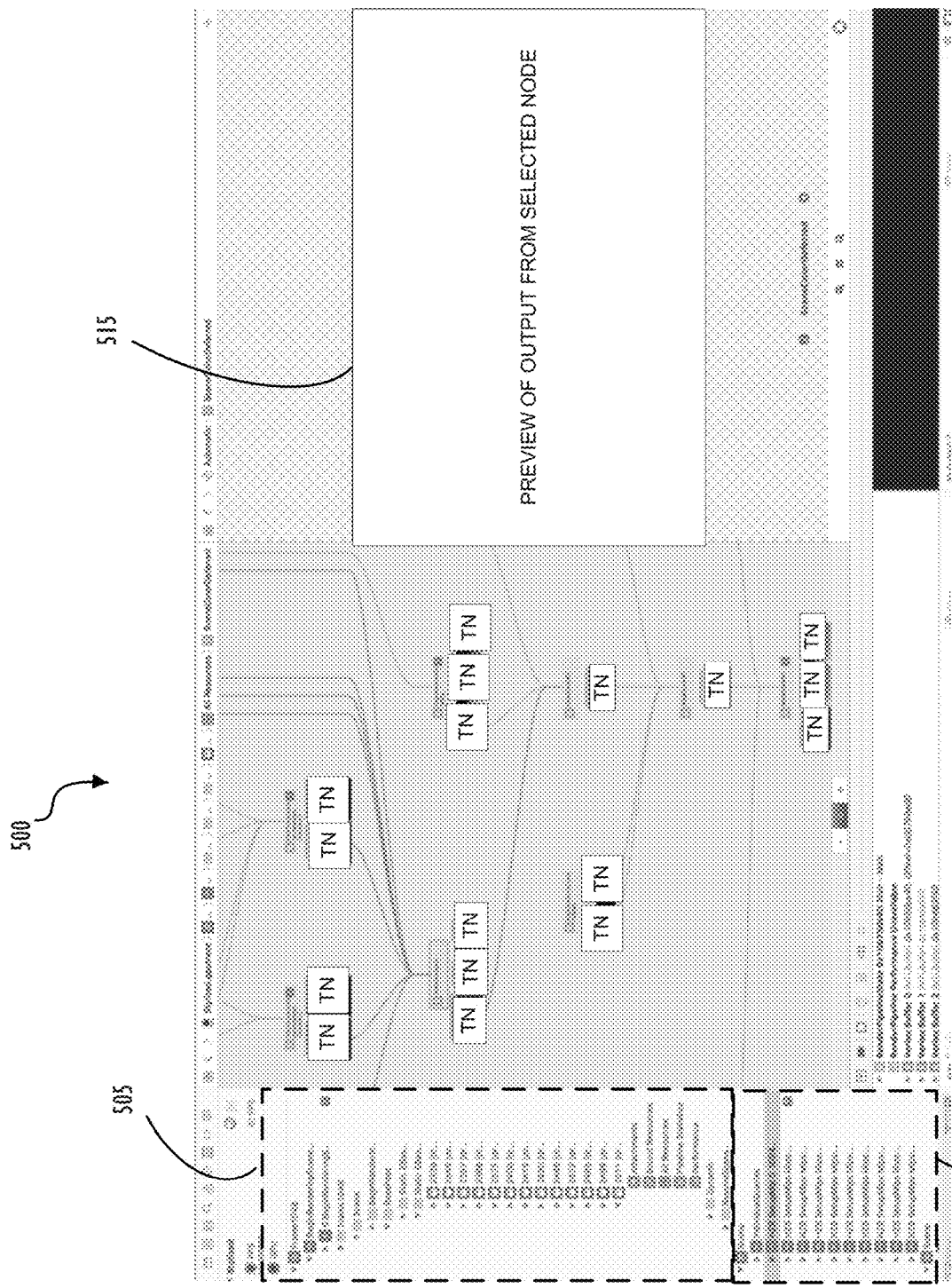
FIG. 5A is a third example screen capture illustrating possible additional information that may be displayed in a Resource Dependency Viewer according to one or more disclosed embodiments.
Figure 5B:
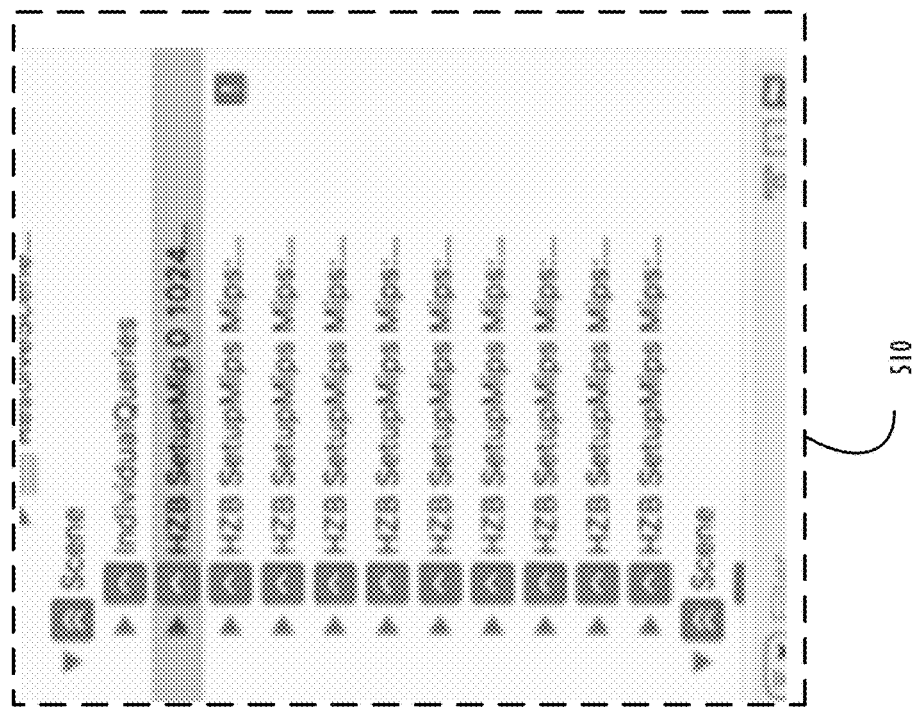
FIG. 5B shows selected elements from FIG. 5A at a larger view to illustrate additional detail.
Figure 5B:
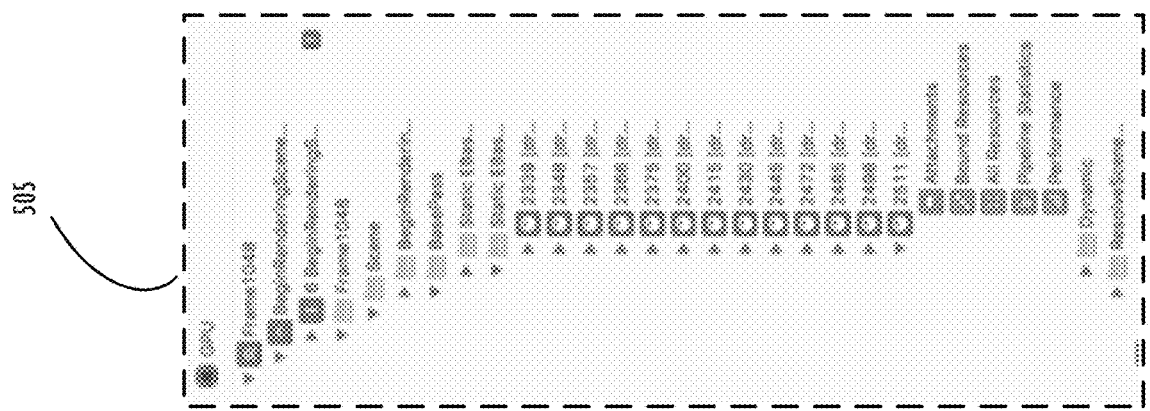

FIG. 5A is a third example screen capture 500 illustrating possible additional information that may be displayed in a Resource Dependency Viewer according to one or more disclosed embodiments. In this example, area 505 illustrates a list view of information about a frame and area 510 provides information about a scene. Each of areas 505 and 510 are provided at a larger view in FIG. 5B. In this example, the selection is highlighted in area 510 and, as explained above, there is a 1:1 relation in what is selected in the debug navigator and the graph. In short making a selection (as opposed to simply scrolling, zooming, or panning) causes an update to other display areas. Also, in this example the Assistant Editor portion shows a more detailed view (e.g., graphical preview) about what is selected. In the dependency graph, edges coming into a selection and going out of a selection may be highlighted (or changed in color) to further identify relationships to a node in question (e.g., encoder). Also, if a user you were to select the encoder itself all of that encoders inputs and outputs would be highlighted whereas if a user were to select a lower level resource the highlight effect may be more limited (e.g., based only on that resource). FIG. 5B represents selected elements from screen capture 500 at a larger view to illustrate additional detail.

Figure 6:
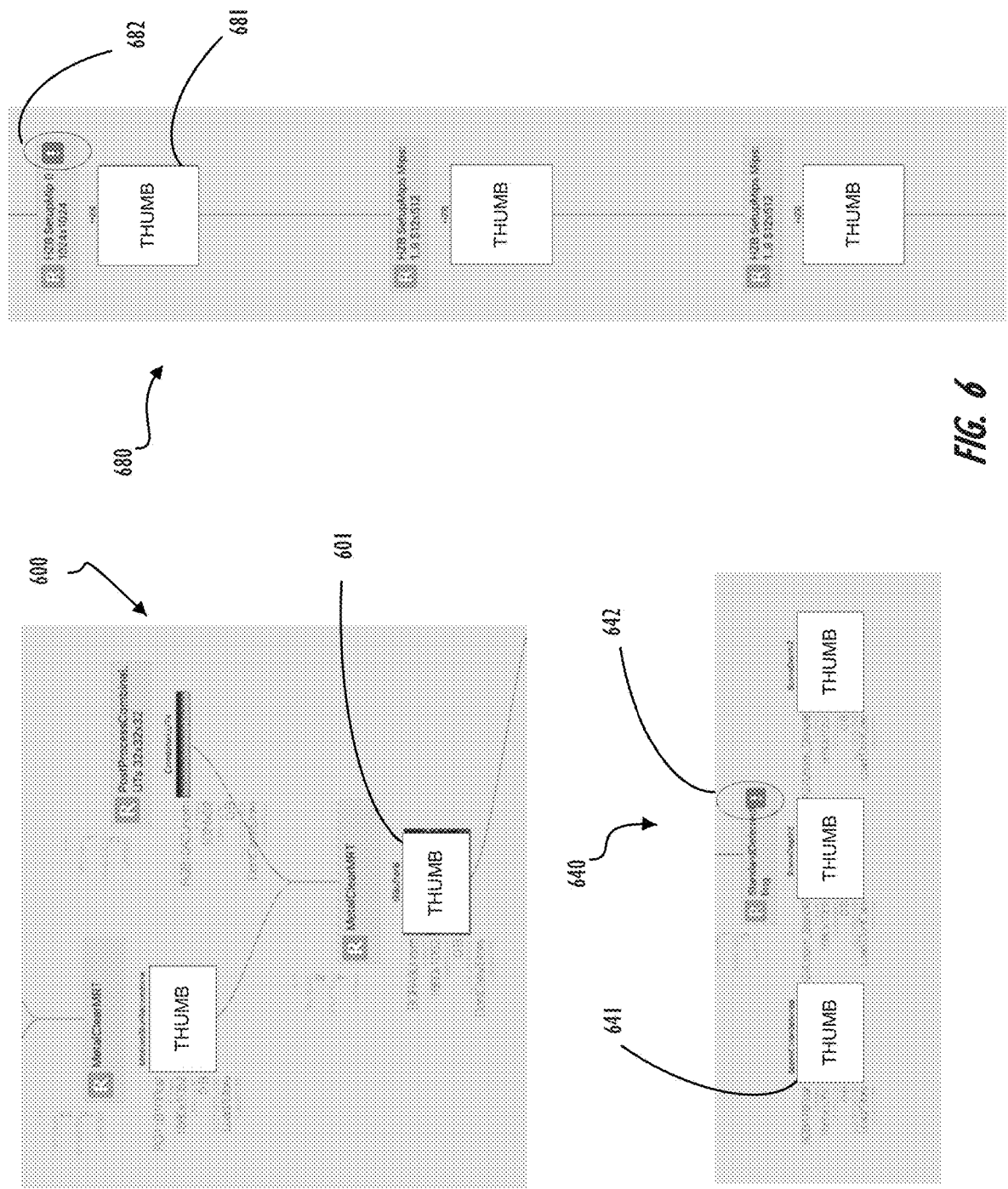
FIG. 6 illustrates possible annotation information and thumbnail views of nodes according to one or more disclosed embodiments.

FIG. 6 illustrates possible annotation information and thumbnail views of nodes according to one or more disclosed embodiments. Block 600 illustrates a portion of a dependency graph where nodes may be represented as thumbnails (e.g., 601) and statistics are presented to the left of each node. That is, for this example implementation, a node may be thought of as having at least three elements associated with it in the dependency graph. These three elements include: 1. Title element (has icon for each encoder type+label); 2. Statistics to the left describing that encoder; and 3. The list of resources underneath. This may represent all the attachments (in the render encoder case)+all texture & buffers that it writes to. Also note that there may be statistics for both the encoder itself and also for each of the one or more resources in the above-mentioned list of resources. Block 640 illustrates another thumbnail 641 and a visual cue 642 (e.g., exclamation icon) as described above. Block 680 illustrates a straight-line portion of a dependency graph and includes thumbnail 681 and visual cue 682.

As can be seen in this example, aspect ratios of the thumbnails 601, 681, and 641 are maintained. Maintaining aspect rations may possibly give the application developer a hint as to what kind of work is being done. For example on a smart phone (e.g., iPhone) when rendering to the screen in portrait mode an application developer would expect a tall texture while in other places (even within the same application) the target of rendering may be a square target. This situation is case specific but by maintaining the aspect ratios in the Dependency View, this type of additional information may provide context for the application developer. In addition at the zoom level represented in FIG. 6, some implementations of the Dependency Viewer may be configured to display statistics (shown next to thumbnail 601 for example) associated with each of the different encoders and resources (e.g., nodes in the dependency graph). The actual type of statistics shown may be varied based on the type of resources and the type of encoder. Further, user configuration options may be provided to allow a user to customize how statistics are handled (e.g., at what zoom level to display and which statistics to display for different situations, encoders, or resources).

Potential issues may be shown by a colored icon, as illustrated in the examples of FIG. 6, on the top right corner of the user interface element. An issue can show up on either the encoder or the resource depending on the type of issue and its association to a programming element. In example 640, there is shown an encoder that has done some work but has no outgoing edges. This represents a situation where the software application is potentially creating a work product and never uses that work product result. Accordingly, a warning may be generated as part of the analysis and a visual cue 642 added to the presentation node. In example 680, there is a list of encoders with the same number of outgoing resources in a linear line; this is often an indication that the work done here can be collapsed into a single encoder. Both of these are simply examples of issues that can be identified by analyzing the structure of the disclosed dependency graph (missing edges, linear links with same number of attachments of same type). Many other heuristics and machine learning algorithms may be run against historical data to be used at run-time to add additional warnings on the dependency graph presented by implementations of the disclosed Resource Dependency Viewer.

Figure 7:
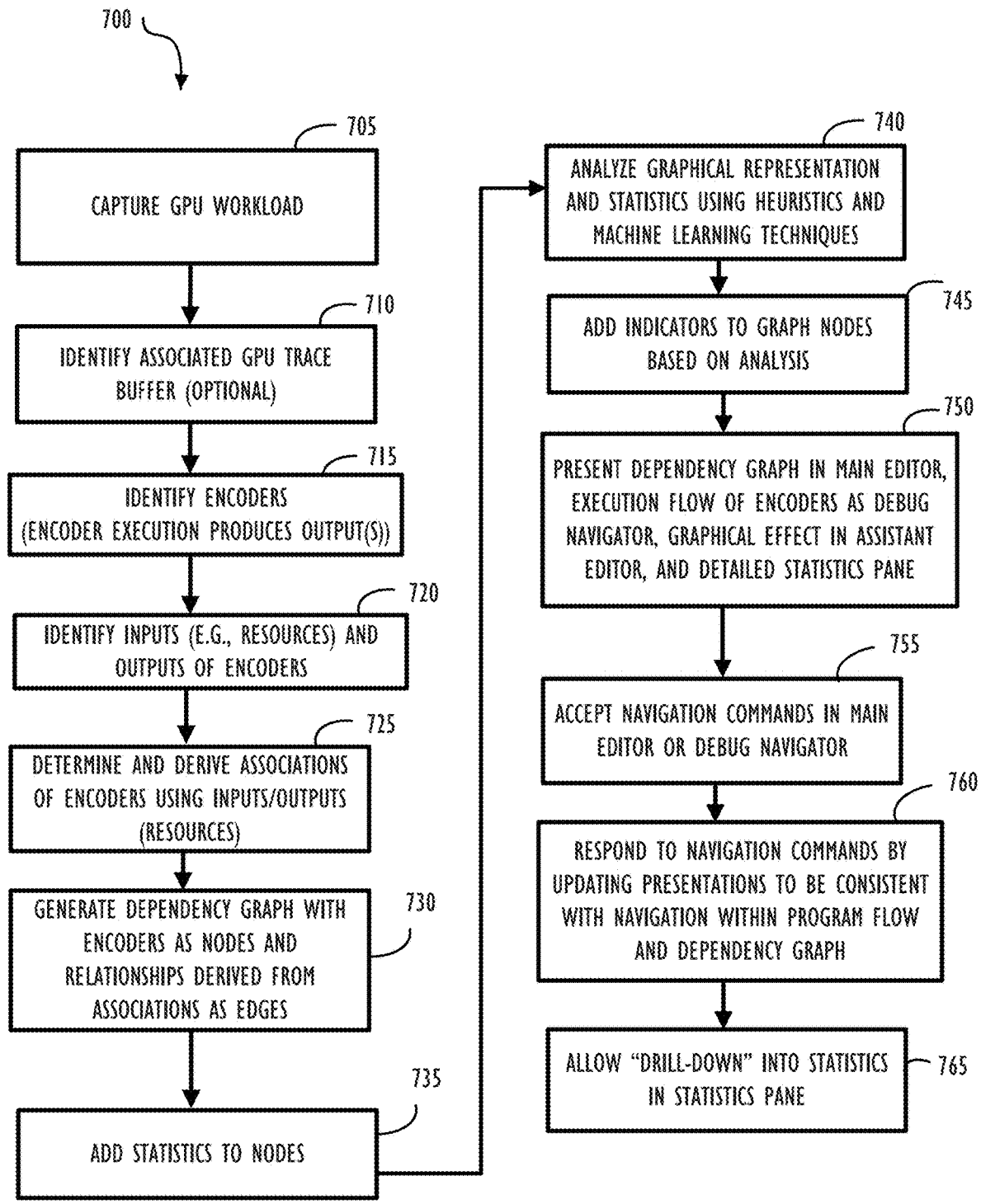
FIG. 7 depicts a flowchart illustrating a graphics processing operation for generating a dependency graph and allowing navigation within the disclosed Resource Dependency Viewer, according to one or more disclosed embodiments.

FIG. 7 depicts a flowchart illustrating a graphics processing operation 700 for capturing (e.g., obtaining) a GPU workload and possible associated GPU trace information to create a dependency graph for presentation in the disclosed Dependency Viewer. In one implementation, operation 700 may be implemented, in part, by processor resource 110 shown in FIGS. 1 and 2. For example, blocks within operation 700 could be implemented by the user space driver 102 and/or kernel driver 103 shown in FIG. 1. Also, operation 700 may include interfacing with one or more components of computing system 800 (described below). The use and discussion of FIG. 7 is only an example to facilitate explanation and is not intended to limit the disclosure to this specific example. As an example, block 710 may be optional such that operation 700 may not perform block 710 each time operation 700 analyzes a captured GPU workload.

Operation 700 begins at block 705 where a GPU workload is captured (e.g., a copy is obtained). Block 710 indicates that an associated GPU trace buffer may be obtained and used to correlate information in the trace buffer with the captured GPU workload to determine a GPU resource utilization and execution path for creation of the disclosed dependency graph for presentation in the disclosed Resource Dependency Viewer. For example, capturing all the Metal API functions that are being submitted for processing as part of a GPU workload. Block 715 indicates that individual encoders may be identified and block 720 indicates that inputs to these individual encoders may be identified. Recall, that execution of encoders creates outputs that may be used as inputs (e.g., along with additional resources) for subsequent encoders. Block 725 indicates that associations of encoders with inputs, outputs, and resources may then be derived (e.g., obtained directly from GPU trace buffer or inferred from the available information). Block 730 indicates that a dependency graph may be generated. For example, as illustrated in the screen capture examples of FIGS. 3-6. The dependency graph, in this example implementation, has encoders for nodes and edges represent relationships between those encoder nodes. Block 735 indicates that additional statistics may be added to nodes of the dependency graph to assist the application developer with ready access to run-time information (e.g., execution statistics and parameters) that may be helpful in their analysis of a graphics application (or GPU compute) program that generated the captured GPU workload. Block 740 indicates that the graphical representation and statistics may be analyzed using heuristics and other computer analysis techniques (e.g., machine learning based on historical data of this and other graphics applications (or GPU compute workloads)). Block 745 indicates that indicators (e.g., visual cues such as icons next to nodes) may be added to the graphical representation of the dependency graph to highlight information determined from the analysis of block 740.

Block 750 indicates that the dependency graph may be presented in a main editor, execution flow of encoders may be presented in a debug navigator, graphical effects may be presented in an assistant editor, and a detailed statistics pane may be presented. All of this information may be presented concurrently and aligned based on a navigation oriented view as illustrated in FIG. 3. In this example, a view "aligned based on a navigation oriented view" refers to the view having correlated information in each pane with respect to a point in execution time as interactively indicated by a debug interface (e.g., Resource Dependency Viewer) user. For example, as described above, user selection of an encoder in the debug navigator will cause the presentation to be updated such that each of the main editor, assistant editor, and detailed statistics panes automatically adjust based on the navigation command (encoder selection) from a user entered into the debug navigator. Similarly, a navigation command on the dependency graph will update all other presentation panes. Continuing with process 700, flow continues to block 755 where a user may enter a navigation command. Navigation commands may include selection of a node on the dependency graph, or selection of an encoder on the debug navigator. Other graphical interaction commands may also be supported, including expansion of "folders" in a list view, or scrolling, panning, and zooming of different panes. Block 760 indicates that, in response to the navigation command of block 755, the presentation of the Dependency Viewer may be updated to have a view aligned based on a navigation oriented view (discussed above). Finally, block 765 indicates that in the statistics pane a user may be able to "drill-down" into statistics presented in that pane. For example, different statistics may be placed into "statistic groups" and represented as hierarchical folders in a list view within the statistics pane.

Illustrative Hardware and Software

The disclosure may have implication and use in and with respect to variety of electronic devices, including single-and multi-processor computing systems, and vertical devices (e.g., cameras, gaming systems, appliances, etc.) that incorporate single-or multi-processing computing systems. The discussion herein is made with reference to a common computing configuration for many different electronic computing devices (e.g., computer, laptop, mobile devices, etc.). This common computing configuration may have a CPU resource including one or more microprocessors and a graphics processing resource including one or more GPUs. Other computing systems having other known or common hardware configurations (now or in the future) are fully contemplated and expected. While the focus of some of the implementations relate to mobile systems employing minimized GPUs, the hardware configuration may also be found, for example, in a server, a workstation, a laptop, a tablet, a desktop computer, a gaming platform (whether or not portable), a television, an entertainment system, a smart phone, a phone, or any other computing device, whether mobile or stationary, vertical, or general purpose.

Figure 8:
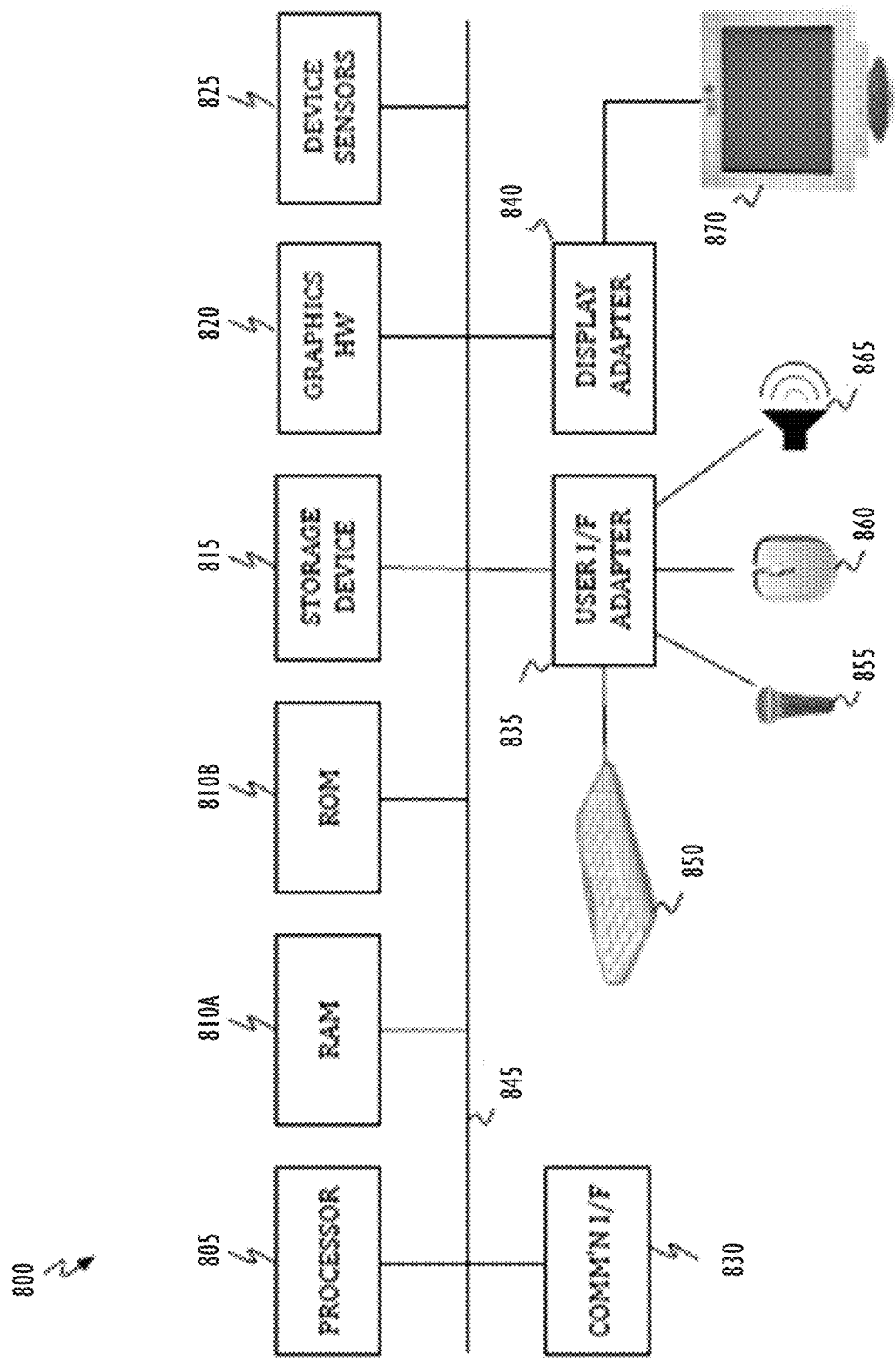
FIG. 8 is a block diagram of a computing system where embodiments of the present disclosure may operate.

Referring to FIG. 8, the disclosed implementations may be performed by representative computing system 800. For example the representative computer system may act as an end-user device or any other device that produces or displays graphics. For example, computing system 800 may be embodied in electronic devices, such as a general purpose computer system, a television, a set top box, a media player, a multi-media entertainment system, an image processing workstation, a hand-held device, or any device that may be coupled with or may incorporate display or presentation devices as discussed herein. Computing system 800 may include one or more processors 805, memory 810 (810A and 810B), one or more storage devices 115, and graphics hardware 820 (e.g., including one or more graphics processors). Computing system 800 may also have device sensors 825, which may include one or more of: depth sensors (such as a depth camera), 3D depth sensor(s), imaging devices (such as a fixed and/or video-capable image capture unit), RGB sensors, proximity sensors, ambient light sensors, accelerometers, gyroscopes, any type of still or video camera, LIDAR devices, SONAR devices, microphones, CCDs (or other image sensors), infrared sensors, thermometers, etc. These and other sensors may work in combination with one or more GPUs, DSPs or conventional microprocessors along with appropriate programming so the sensor outputs may be properly interpreted and/or combined and interpreted.

Returning to FIG. 8, system 800 may also include communication interface 830, user interface adapter 835, and display adapter 840—all of which may be coupled via system bus, backplane, fabric or network 845. Memory 810 may include one or more different types of non-transitory media (e.g., solid-state, DRAM, optical, magnetic, etc.) used by processor 805 and graphics hardware 820. For example, memory 810 may include memory cache, read-only memory (ROM), and/or random access memory (RAM). Storage 815 may include one or more non-transitory storage media including, for example, magnetic disks (fixed, floppy, and removable) and tape, optical media such as CD-ROMs and digital video disks (DVDs), and semiconductor memory devices such as Electrically Programmable Read-Only Memory (EPROM), solid state storage drives, and Electrically Erasable Programmable Read-Only Memory (EE-PROM). Memory 810 and storage 815 may be used to retain media data (e.g., audio, image, and video files), preference information, device profile information, computer program instructions organized into one or more modules and written in any desired computer programming language, and any other suitable data. When executed by processor 805 and/or graphics hardware 820, such computer program code may implement one or more of operations or processes described herein. In addition, the system may employ microcontrollers (not shown), which may also execute such computer program code to implement one or more of the operations or computer readable media claims illustrated herein. In some implementations, the microcontroller(s) may operate as a companion to a graphics processor or a general-purpose processor resource.

Communication interface 830 may include semiconductor-based circuits and may be used to connect computing system 800 to one or more networks. Illustrative networks include, but are not limited to: a local network, such as a USB network; a business's local area network; and a wide area network such as the Internet and may use any suitable technology (e.g., wired or wireless). Communications technologies that may be implemented include cell-based communications (e.g., LTE, CDMA, GSM, HSDPA, etc.) or other communications (Apple lightning, Ethernet, WiFi®, Bluetooth®, USB, Thunderbolt®, Firewire®, etc.). (WIFI is a registered trademark of the Wi-Fi Alliance Corporation. BLUETOOTH is a registered trademark of Bluetooth Sig, Inc. THUNDERBOLT and FIREWIRE are registered trademarks of Apple Inc.). User interface adapter 835 may be used to connect keyboard 850, microphone 855, pointer device 860, speaker 865, and other user interface devices such as a touchpad and/or a touch screen (not shown). Display adapter 840 may be used to connect one or more displays 870.

Processor 805 may execute instructions necessary to carry out or control the operation of many functions performed by computing system 800 (e.g., evaluation, transformation, mathematical computation, or compilation of graphics programs, etc.). Processor 805 may, for instance, drive display 870 and receive user input from user interface adapter 835 or any other user interfaces embodied by a system. User interface adapter 835, for example, can take a variety of forms, such as a button, a keypad, a touchpad, a mouse, a dial, a click wheel, a keyboard, a display screen, and/or a touch screen. In addition, processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 in performing computational tasks. In some implementations, graphics hardware 820 may include CPU-integrated graphics and/or one or more discrete programmable GPUs. Computing system 800 (implementing one or more implementations discussed herein) can allow for one or more users to control the same system (e.g., computing system 800) or another system (e.g., another computer or entertainment system) through user activity, which may include audio instructions, natural activity, and/or pre-determined gestures such as hand gestures.

Various implementations within the disclosure may employ sensors, such as cameras. Cameras and like sensor systems may include auto-focus systems to accurately capture video or image data ultimately used in a variety of applications, such as photo applications, augmented reality applications, virtual reality applications, and gaming. Processing images and performing recognition on the images received through camera sensors (or otherwise) may be performed locally on the host device or in combination with network accessible resources (e.g., cloud servers accessed over the Internet).

Returning to FIG. 8, device sensors 825 may capture contextual and/or environmental phenomena such as time; location information; the status of the device with respect to light, gravity, and the magnetic north; and even still and video images. In addition, network-accessible information such as weather information may also be used as part of the context. All captured contextual and environmental phenomena may be used to provide context to user activity or information about user activity. For example, in accessing a gesture or the expression or emotion of a user, the contextual information may be used as part of the analysis, and the analysis may be performed using the techniques discussed herein.

Output from the device sensors 825 may be processed, at least in part, by processors 805 and/or graphics hardware 820, and/or a dedicated image processing unit incorporated within or without computing system 800. Information so captured may be stored in memory 810 and/or storage 815 and/or any storage accessible on an attached network. Memory 810 may include one or more different types of media used by processor 805, graphics hardware 820, and device sensors 825 to perform device functions. Storage 815 may store data such as media (e.g., audio, image, and video files); metadata for media; computer program instructions; graphics programming instructions and graphics resources; and other software, including database applications (e.g., a database storing avatar frames), preference information, device profile information, and any other suitable data. Memory 810 and storage 815 may be used to retain computer program instructions or code organized into one or more modules in either compiled form or written in any desired computer programming language. When executed by, for example, a microcontroller, GPU or processor 805, such computer program code may implement one or more of the acts or functions described herein (e.g., interpreting and responding to user activity including commands and/or gestures).

As noted above, implementations within this disclosure include software. As such, a description of common computing software architecture is provided as expressed in a layer diagram in FIG. 9. Like the hardware examples, the software architecture discussed here is not intended to be exclusive in any way, but rather to be illustrative. This is especially true for layer-type diagrams, which software developers tend to express in somewhat differing ways. In this case, the description begins with layers starting with the base hardware layer 995 illustrating hardware layer 940, which may include memory, general purpose processors, graphics processors, microcontrollers, or other processing and/or computer hardware such as memory controllers and specialized hardware. Above the hardware layer is the operating system kernel layer 990 showing an example as operating system kernel 945, which is kernel software that may perform memory management, device management, and system calls. The operating system kernel layer 990 is the typical location of hardware drivers, such as a graphics processor drivers. The notation employed here is generally intended to imply that software elements shown in a layer use resources from the layers below and provide services to layers above. However, in practice, all components of a particular software element may not behave entirely in that manner.

Returning to FIG. 9, operating system services layer 985 is exemplified by operating system services 950. Operating system services 950 may provide core operating system functions in a protected environment. In addition, operating system services shown in operating system services layer 985 may include frameworks for OpenGL/OpenCL 951 CUDA® or the like, Metal® 952, user space drivers 953, and a Software Rasterizer 954. (CUDA is a registered trademark of NVIDIA Corporation.) While most of these examples all relate to graphics processor processing or graphics and/or graphics libraries, other types of services are contemplated by varying implementations of the disclosure. These particular examples also represent graphics frameworks/libraries that may operate in the lower tier of frameworks, such that developers may use shading and primitives and/or obtain fairly tightly coupled control over the graphics hardware. In addition, the particular examples named in FIG. 9 may also pass their work product on to hardware or hardware drivers, such as the graphics processor driver, for display-related material or compute operations.

Referring again to FIG. 9, OpenGL®/OpenCL® 951 represent examples of well-known libraries and application programming interfaces for graphics processor compute operations and graphics rendering including 2D and 3D graphics. (OPENGL is a registered trademark of Silicon Graphics International Corporation. OPENCL is a registered trademark of Apple Inc.). Metal 952 also represents a published graphics library and framework, but it is generally considered lower level than OpenGL/OpenCL 951, supporting fine-grained, low-level control of the organization, processing, and submission of graphics and computation commands, as well as the management of associated data and resources for those commands. User space drivers 953 is software relating to the control of hardware that exists in the user space for reasons that are typically related to the particular device or function. In many implementations, user space drivers 953 work cooperatively with kernel drivers and/or firmware to perform the overall function of a hardware driver. Software Rasterizer 954 refers generally to software used to make graphics information such as pixels without specialized graphics hardware (e.g., using only the CPU). These libraries or frameworks shown within the operating system services layer 985 are only exemplary and intended to show the general level of the layer and how it relates to other software in a sample arrangement (e.g., kernel operations usually below and higher-level Applications Services 960 usually above). In addition, it may be useful to note that Metal 952 represents a published framework/library of Apple Inc. that is known to developers in the art. Furthermore, OpenGL/OpenCL 951 may represent frameworks/libraries present in current versions of software distributed by Apple Inc.

Above the operating system services layer 985 there is an Application Services layer 980, which includes Sprite Kit 961, Scene Kit 962, Core Animation 963, Core Graphics 964, and other Applications Services 960. The operating system services layer 985 represents higher-level frameworks that are commonly directly accessed by application programs. In some implementations of this disclosure the operating system services layer 985 includes graphics-related frameworks that are high level in that they are agnostic to the underlying graphics libraries (such as those discussed with respect to operating system services layer 985). In such implementations, these higher-level graphics frameworks are meant to provide developer access to graphics functionality in a more user/developer friendly way and allow developers to avoid work with shading and primitives. By way of example, Sprite Kit 961 is a graphics rendering and animation infrastructure made available by Apple Inc. Sprite Kit 961 may be used to animate textured images or "sprites." Scene Kit 962 is a 3D-rendering framework from Apple Inc. that supports the import, manipulation, and rendering of 3D assets at a higher level than frameworks having similar capabilities, such as OpenGL. Core Animation 963 is a graphics rendering and animation infrastructure made available from Apple Inc. Core Animation 963 may be used to animate views and other visual elements of an application. Core Graphics 964 is a two-dimensional drawing engine from Apple Inc., which provides 2D rendering for applications.

Above the application services layer 980, there is the application layer 975, which may comprise any type of application program. By way of example, FIG. 9 shows three specific applications: photos 971 (a photo management, editing, and sharing program), Quicken® 972 (a financial management program), and iMovie® 973 (a movie making and sharing program). (QUICKEN is a registered trademark of Intuit Inc. IMOVIE is a registered trademark of Apple Inc.). Application layer 975 also shows two generic applications 970 and 974, which represent the presence of any other applications that may interact with or be part of the inventive implementations disclosed herein. Generally, some implementations of the disclosure employ and/or interact with applications that produce displayable and/or viewable content or produce computational operations that are suited for GPU processing.

In evaluating operating system services layer 985 and applications services layer 980, it may be useful to realize that different frameworks have higher- or lower-level application program interfaces, even if the frameworks are represented in the same layer of the FIG. 9 diagram. The illustration of FIG. 9 serves to provide a general guideline and to introduce exemplary frameworks that may be discussed later. Furthermore, some implementations of the disclosure may imply that frameworks in application services layer 980 make use of the libraries represented in operating system services layer 985. Thus, FIG. 9 provides intellectual reinforcement for these examples. Importantly, FIG. 9 is not intended to limit the types of frameworks or libraries that may be used in any particular way or in any particular implementation. Generally, many implementations of this disclosure relate to the ability of applications in layer 975 or frameworks in layers 980 or 985 to divide long continuous graphics processor tasks into smaller pieces. In addition, many implementations of the disclosure relate to graphics processor (e.g., GPU) driver software in operating system kernel layer 990 and/or embodied as microcontroller firmware in hardware layer 995; such drivers performing a scheduling function for the graphics processor resource (e.g., GPU).

Figure 10:
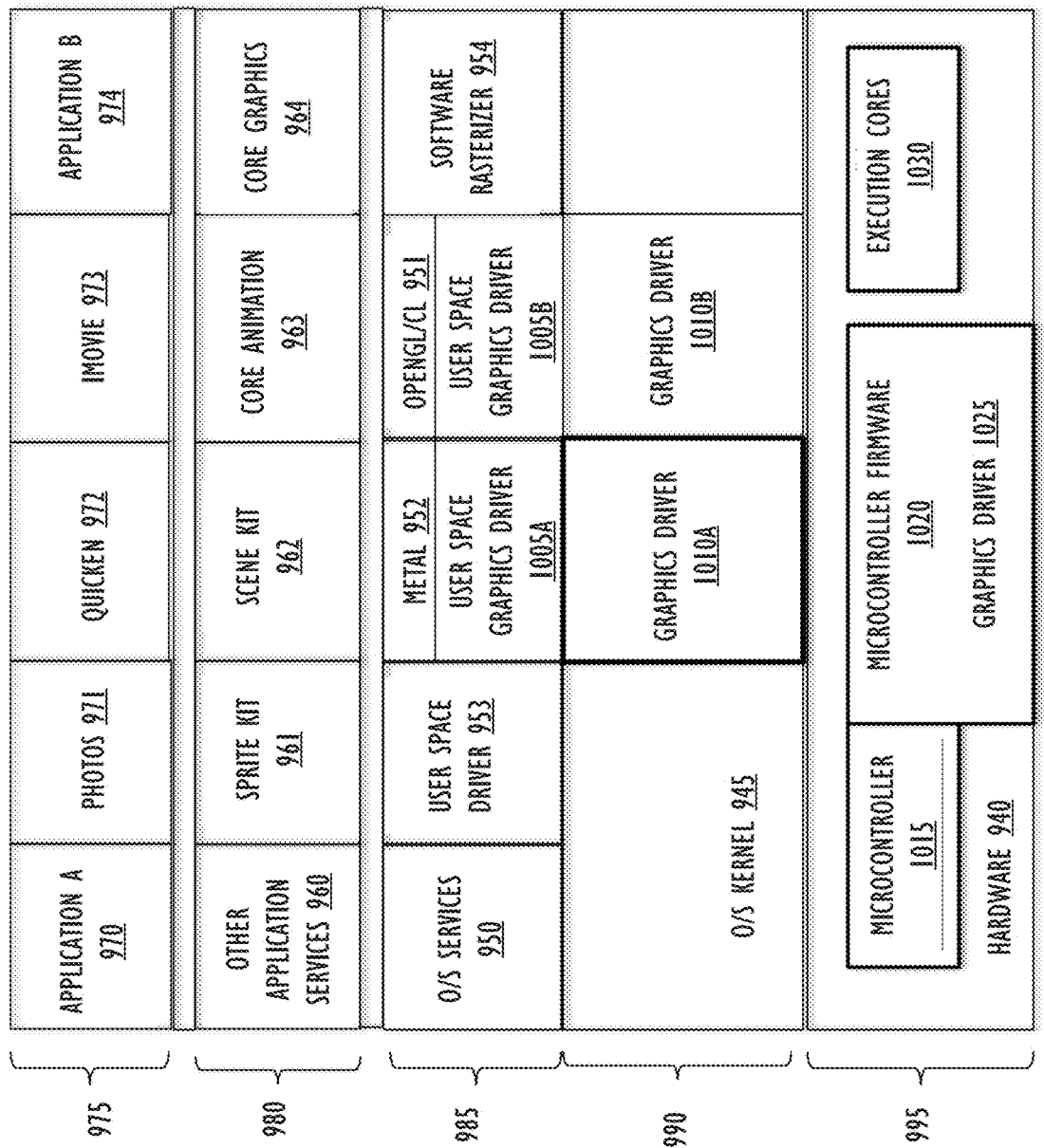
FIG. 10 is a block diagram of another implementation of a software layer and architecture where embodiments of the present disclosure may operate.

FIG. 10 illustrates a software architecture similar to the standard architecture shown in FIG. 9. By way of distinction, the architecture of FIG. 10 shows: a user space graphics driver 1005A and 1005B; a kernel graphics driver 1010A and 1010B in the operating system kernel 945; a microcontroller 1015, accompanied by microcontroller firmware 1020, including graphics driver firmware 1025 in the hardware layer 940; and an execution cores 1030 in the hardware layer 940. The presence of multiple instances of a graphics driver (user space graphics driver 1005A and 1005B, kernel graphics driver 1010A and 1010B, and graphics driver firmware 1025 in the microcontroller firmware 1020) indicates the various options for implementing the graphics driver. As a matter of technical possibility any of the three shown drivers might independently operate as a sole graphics driver. In some implementations of the disclosure, the overall graphics driver is implemented in a combination of kernel graphics driver 1010A and 1010B and graphics driver firmware 1025 (e.g., in the operating system kernel and the microcontroller firmware, respectively). In other implementations, the overall graphics driver may be implemented by the combined effort of all three shown drivers 1005A and 1005B, 1010A and 1010B, and 1025.

At least one implementation is disclosed and variations, combinations, and/or modifications of the implementation(s) and/or features of the implementation(s) made by a person having ordinary skill in the art are within the scope of the disclosure. Alternative implementations that result from combining, integrating, and/or omitting features of the implementation(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Many other implementations will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A non-transitory program storage device, readable by a processor and comprising instructions stored thereon to cause the processor to:
    obtain a graphics processing unit (GPU) workload created by a graphics processor hardware resource;
    create a data structure for a plurality of encoders and resources identified in the GPU workload after processing by a GPU, the data structure representative of a dependency graph comprising nodes representing the plurality of encoders or the resources and edges representing relationships between the nodes;
    obtain, based on the GPU workload, an execution statistic pertaining to an execution of at least one encoder of the plurality of encoders on the GPU;
    present a graphical display representation of at least a portion of the dependency graph and the obtained execution statistic associated with a node responsible for at least a portion of the obtained execution statistic;
    identify, based on the data structure, an orphaned node or a straight-line relationship between a plurality of nodes of the dependency graph; and
    associate a warning indication with the orphaned node or the plurality of nodes forming the straight-line relationship.

2. The non-transitory program storage device of claim 1, wherein the graphics processor hardware resource comprises a general-purpose processor configured to emulate the GPU.

3. The non-transitory program storage device of claim 1, wherein the graphics processor hardware resource comprises the GPU and the GPU workload comprises information pertaining to a GPU compute processing function.

4. The non-transitory program storage device of claim 1, wherein the dependency graph represents an execution flow of the plurality of encoders and the resources used in the GPU workload.

5. The non-transitory program storage device of claim 1, wherein the instructions further cause the processor to:
obtain execution trace information from a GPU trace buffer, wherein creating the data structure is based on the execution trace information.

6. The non-transitory program storage device of claim 1, wherein the graphical display representation of the dependency graph includes a first visual cue for each node in the dependency graph associated with the warning indication.

7. The non-transitory program storage device of claim 6, wherein the instructions further cause the processor to:
determine a possible statistic of interest based on a GPU trace buffer associated with an execution flow of the execution of the at least one encoder of the plurality of encoders using heuristics, wherein the graphical display representation of the dependency graph includes a second visual cue for each node in the dependency graph associated with the possible statistic of interest.

8. The non-transitory program storage device of claim 1, wherein the graphical display representation comprises a plurality of segregated display portions including at least two of a debugger navigation portion, a main display portion, a statistics portion, and an assistant editor portion.

9. The non-transitory program storage device of claim 8, wherein the instructions further cause the processor to:
receive an indication of a navigation command in one of the plurality of segregated display portions; and
update the plurality of segregated display portions responsive to the navigation command.

10. A system comprising:
memory; and
a processor operable to interact with the memory, and configured to:
obtain a graphics processing unit (GPU) workload created by a graphics processor hardware resource;
create a data structure for a plurality of encoders and resources identified in the GPU workload after processing by a GPU, the data structure representative of a dependency graph comprising nodes representing the plurality of encoders or the resources, and edges representing relationships between the nodes;
obtain, based on the GPU workload, an execution statistic pertaining to an execution of at least one encoder of the plurality of encoders on the graphics processor;
present a graphical display representation of at least a portion of the dependency graph and the obtained execution statistic associated with a node responsible for at least a portion of the obtained execution statistic;
identify, based on the data structure, an orphaned node, an orphaned sub-graph portion, or a straight-line relationship between a plurality of nodes of the dependency graph; and
associate a warning indication with the orphaned node, the orphaned sub-graph portion, or the plurality of nodes forming the straight-line relationship.

11. The system of claim 10, wherein the processor is further configured to:
obtain execution trace information from a GPU trace buffer; wherein the dependency graph represents an execution flow of encoders and resources used in the GPU workload.

12. The system of claim 10, wherein the graphical display representation of the dependency graph includes a first visual cue for each node in the dependency graph associated with the warning indication.

13. The system of claim 12, wherein the processor is further configured to:
identify, based on information from a GPU trace buffer associated with execution flow of the execution associated with the at least one encoder of the plurality of encoders using heuristics, at least one possible statistic of interest; and
provide a second visual cue for each node in the dependency graph associated with the at least one possible statistic of interest.

14. The system of claim 10, wherein the graphical display representation comprises a plurality of segregated display portions including at least two of a debugger navigation portion, a main display portion, a statistics portion, and an assistant editor portion.

15. The system of claim 14, wherein the processor is further configured to:
receive an indication of a navigation command in one of the plurality of segregated display portions; and
update the plurality of segregated display portions responsive to the navigation command.

16. A computer implemented method of providing an interactive interface representative of execution flow to create a result of processing on a graphics processing unit (GPU), the method comprising:
obtaining a GPU workload created by a graphics processor hardware resource;
creating a data structure for a plurality of encoders and resources identified in the GPU workload after processing by the GPU, the data structure representative of a dependency graph comprising nodes representing the plurality of encoders or the resources and edges representing relationships between the nodes;
obtaining, based on the GPU workload, an execution statistic pertaining to an execution of at least one encoder of the plurality of encoders on the GPU; and
presenting a graphical display representation of at least a portion of the dependency graph and the obtained execution statistic associated with a node responsible for at least a portion of the obtained execution statistic;
identify, based on the data structure, an orphaned node or a straight-line relationship between a plurality of nodes of the dependency graph; and
associate a warning indication with the orphaned node or the plurality of nodes forming the straight-line relationship.

17. The computer-implemented method of claim 16, wherein the graphics processor hardware resource comprises a general-purpose processor configured to emulate the GPU.

18. The computer-implemented method of claim 16, wherein the graphics processor hardware resource comprises the GPU.

* * * * *